Aug. 22, 1967 J. OPPENHEIMER ETAL 3,337,806

CLOCK CONTROLLED SIGNAL RECEIVERS

Filed Oct. 7, 1963 3 Sheets-Sheet 1

INVENTORS.
JESS OPPENHEIMER
JAMES R. DENNIS
by Bernard Kriegel
ATTORNEY.

INVENTORS.
JESS OPPENHEIMER
JAMES R. DENNIS
by Bernard Kriegel
ATTORNEY

Aug. 22, 1967 J. OPPENHEIMER ETAL 3,337,806

CLOCK CONTROLLED SIGNAL RECEIVERS

Filed Oct. 7, 1963 3 Sheets-Sheet 3

INVENTORS.
JESS OPPENHEIMER
JAMES R. DENNIS
by Bernard Kriegel
ATTORNEY

1

3,337,806

CLOCK CONTROLLED SIGNAL RECEIVERS

Jess Oppenheimer, 549 Moreno Ave., Los Angeles, Calif. 90049, and James R. Dennis, Beverly Hills, Calif.; said Dennis assignor to said Oppenheimer
Filed Oct. 7, 1963, Ser. No. 314,244
16 Claims. (Cl. 325—396)

The present invention relates to automatically controlled signal receivers, such as radios, and more particularly to receivers in which one or more conditions can be preselected for subsequent accomplishment under the control of timing mechanisms.

An object of the invention is to provide a clock controlled radio receiver which automatically functions at a preset time to turn on the receiver and automatically tune in a preselected station, or automatically adjust the volume to a preselected value, or perform both tuning and volume adjustments. Such automatic adjustment will occur regardless of the prior station or volume setting.

Another object of the invention is to provide a clock controlled radio receiver in which a station, or volume of such station, or both, can be preselected, the receiver being automatically activated at a preset time to the preselected condition or conditions regardless of prior station and volume settings, the receiver being capable of manipulation at any time in its normal manner to change the station and volume. If the preselected settings are not changed, but the receiver has been adjusted to some other station and volume, the receiver actuating mechanism at the preset time will retune the receiver in accordance with its preselected settings.

A further object of the invention is to provide a clock controlled radio receiver in which the station or volume or both are tuned to preselected conditions at a preset time, the same tuning controls being used in making the preselections as are used in controlling the receiver in its manual or ordinary manner. If desired, the actuating mechanism for tuning the receiver to its preselected conditions can be rendered ineffective.

An additional object of the invention is to provide an improved mechanical movement for adjusting a member to a preselected condition.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings.

2

Figure 1:
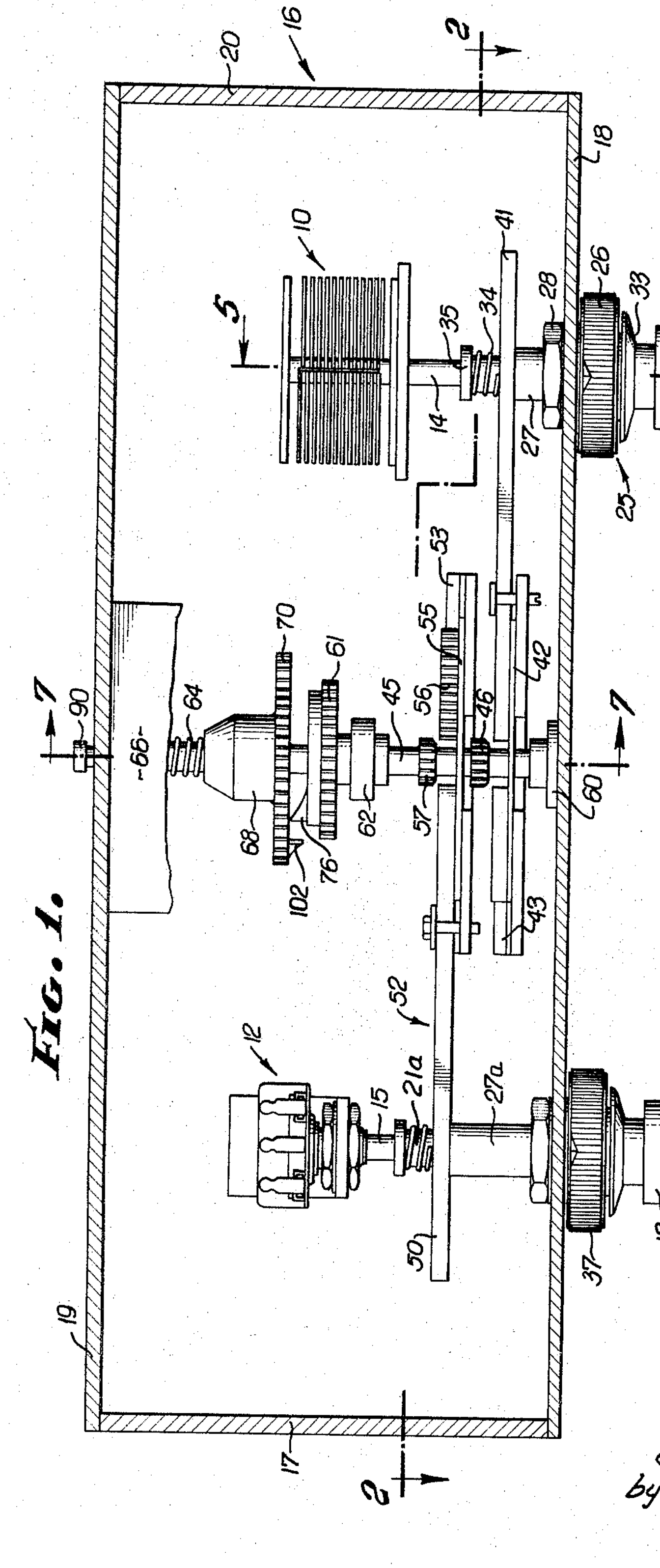
FIGURE 1 is a top plan view of a portion of a time controlled radio receiver disposed within an enclosing housing.

The invention is illustrated in the drawings as applied to a radio receiver having the usual variable condenser 10 for selecting the station through appropriate manipulation of a tuner knob 11 and also having the usual switch and volume control device 12 adapted to be manipulated by a volume control 13. A tuning shaft 14 extends from the variable condenser to be turned by the turner knob. A volume control shaft 15 extends from the volume control mechanism to be rotated by the volume control knob.

In addition to selecting the station through adjustment of the variable condenser and of the volume control in the usual manner, a station can be preselected and the volume of such station can also be preselected, the tuning shaft 14 and volume control shaft 15 being manipulated by a clock controlled mechanism to the preselected degree. Such mechanism and the radio receiver mechanism itself are contained within a suitable housing 16 that may include a base 17, a front wall or panel 18, a rear wall 19, and side walls 20.

The variable condenser or station tuning shaft 14 extends through the front panel within a hollow shaft 21 to which the tuner knob 11 is suitably secured, as by means of a set screw 22. The tuner knob and its hollow shaft are movable axially on the tuning shaft, but are rotatable therewith. As disclosed in the drawings, the tuner shaft 14 has a pin 23 extending laterally therethrough received within elongate diametrically opposite slots 24 in the hollow shaft 21. Thus, turning or rotation of the tuner knob 11 effects turning of the tuning shaft 14, such motion being transmitted from the hollow shaft 21 through the pin 23 to the tuning shaft.

The turner knob 11 and the hollow shaft 21 can shift axially with respect to the tuning shaft to either couple or uncouple the turner knob and the tuning shaft to a tuner preselector 25 rotatably mounted on the hollow shaft and which has a clutch portion 26 forwardly of the front panel and a hub portion 27 extending through the front panel 18. A suitable nut 28 is threaded on the tuner preselector 25, bearing against a rear washer 29 engaging the rear of the panel, there also being a front washer 30 between the preselector and the front of the panel to mount the tuner preselector for rotation in the panel and on the hollow shaft, but preventing axial movement of the tuner preselector with respect to the panel 18.

The tuner preselector 25 is releasably coupled to the tuner knob by forming clutch teeth 31 on its driving clutch portion 26 which are adapted to be engaged by clutch teeth 32 on the driven clutch member 33 that can be formed integral with the tuner knob 11. The driven clutch member 33 is normally urged into clutching engagement with the driving clutch member 26 by a helical compression spring 34 bearing against an inner flange 35 of the hollow shaft 21 and also against the inner end of the tuner preselector 25. The spring urges the hollow shaft 21 and tuner knob 11 inwardly along the tuning shaft 14 to engage the driven clutch member 33 with the driving clutch member 26 and thereby couple the tuner knob 11 and preselector 25 for joint movement. However, the tuner knob 11 can be grasped and shifted outwardly against the force of the spring 34 to disengage the clutch 33, 26 and thereby permit relative rotation to take place between the tuner knob 11 and the tuner preselector 25. Release of the tuner knob allows the spring 34 to re-engage the driven clutch member 33 with the driving clutch member 26. The teeth 31, 32 on the driving and driven clutch members are of comparatively fine mesh to permit relatively small angular adjustments between the tuner knob 11 and the tuner preselector 25.

Figure 6:
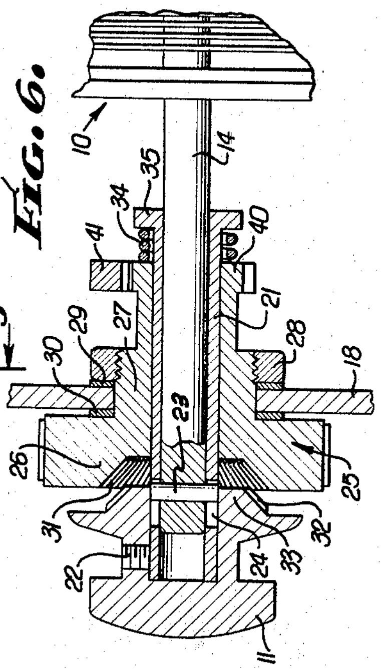
FIG. 6 is a view similar to FIG. 5 with the clutch disengaged.
Figure 5:
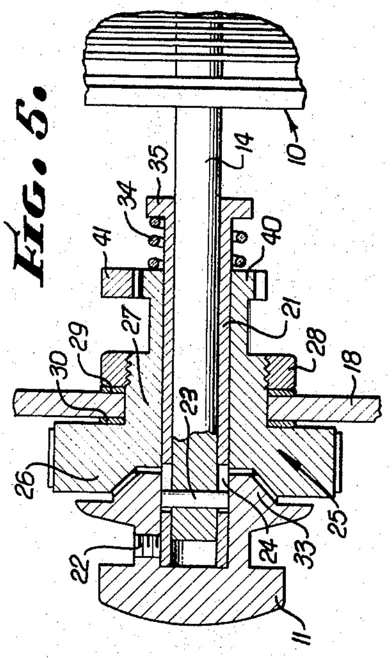
FIG. 5 is an enlarged section taken along the line 5—5 on FIG. 1 showing the clutch engaged.
Figure 2:
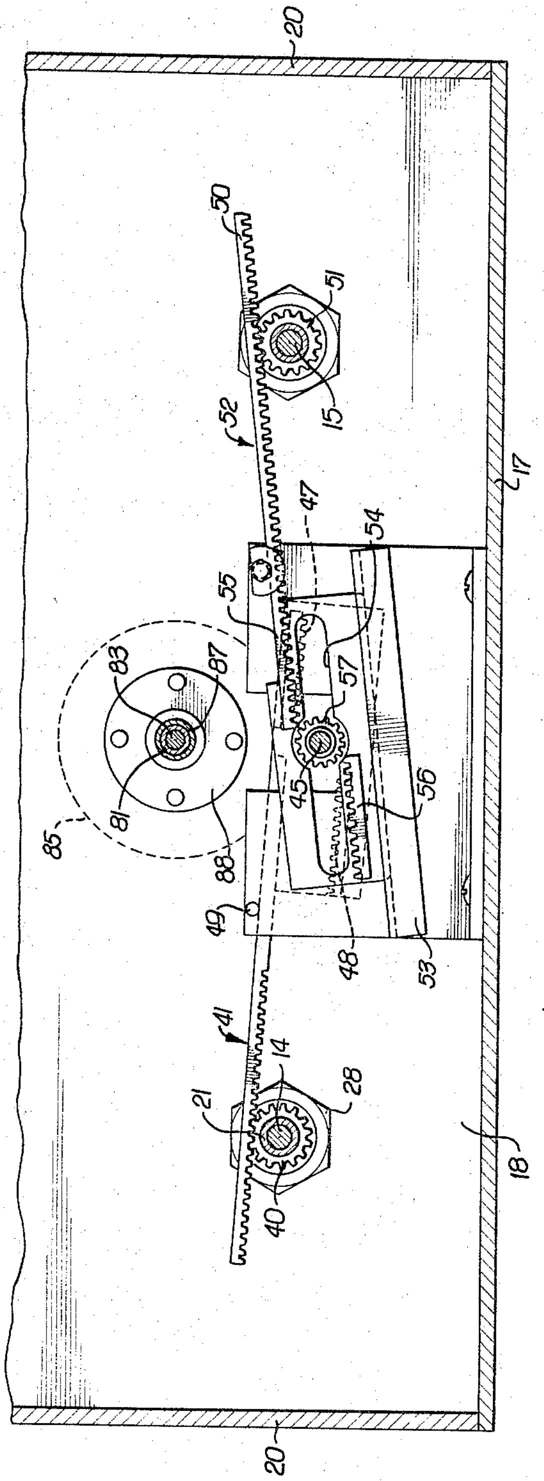
FIG. 2 is a section taken along the line 2—2 on FIG. 1.
Figure 3:
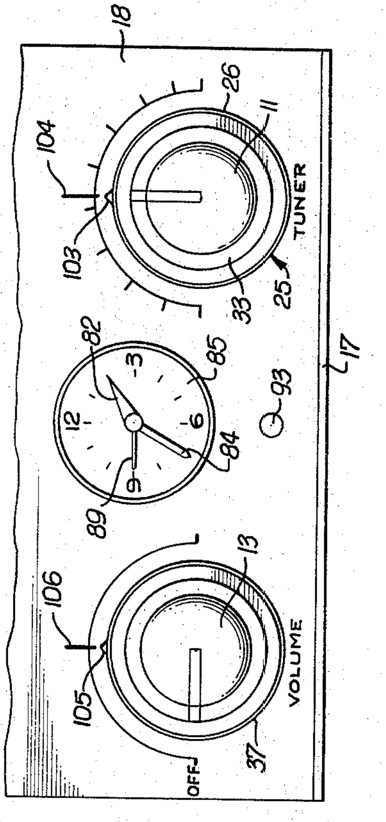
FIG. 3 is a front view of the receiver on a reduced scale.
Figure 4:
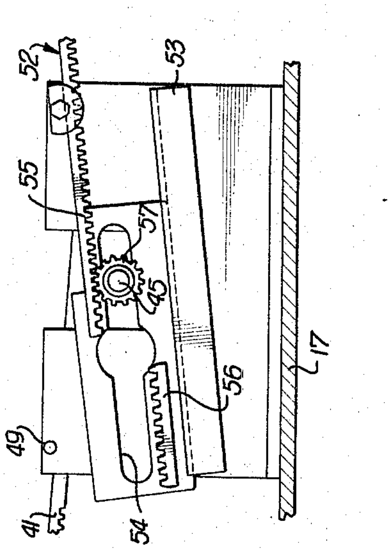
FIG. 4 is a front view of a portion of the rack and pinion actuating mechanism.

A releasable clutch device substantially identical to the one shown in FIGS. 5 and 6 is provided between the switch and volume control knob 13 and the volume control shaft 15, there being a volume preselector 37 rotatably mounted in the front panel and adapted to be releasably clutched to the volume control knob 13 for angular adjustment relative thereto. As shown in FIG. 1, the hub 27*a* and hollow shaft 21*a* are longer than the corresponding members of the tuning device.

The tuner selector 25 has a gear 40 at its inner portion engaging a tuning rack 41 integral with or fixed to a slide member 42 slidable in a guide bracket 43 suitably secured to and extending upwardly from the base 17 of the housing. Longitudinal movement of the rack 41 rotates the tuner selector 25 and also rotates the tuning shaft 14, assuming the driving and driven clutch members 26, 33 to be coengaged. The slide member 42 has an elongated slot 44 therein through which a drive or actuator shaft 45 extends, this shaft having a tuning pinion 46 slidably fixed thereto which is adapted to engage an upper rack 47 fixed to the slide member or a lower rack 48 fixed to the slide member. The upper rack 47 is disposed on one side of a central vertical plane of the slide member parallel to the drive shaft; whereas, the lower rack 48 extends in the opposite direction on the other side of such plane. The inner ends of the upper and lower racks 47, 48 are spaced from one another to such an extent that the drive pinion 46 cannot simultaneously engage both of such racks. When the drive pinion 46 is located relatively between the inner ends of the upper and lower racks 47, 48, it is out of mesh with their respective teeth, or in a neutral position, and the motion of the drive pinion will not be transmitted to either rack. When the drive pinion 46 engages the upper rack 47, it will shift the slide member 42 and the tuning rack 41 in one direction, and when it engages the lower rack 48, it will shift the slide member and the tuning rack 41 in the opposite direction. Since the tuning rack is constantly engaging the tuning gear 40, rotation of the latter in one direction or the opposite direction will occur, depending upon the particular rack 47 or 48 with which the drive pinion 46 is in mesh. The slide member 42 is retained in its guide 43 by a retaining pin 49 extending from the guide and slidably engaging its upper surface.

The drive or actuating shaft 45 is disposed between and parallel to the tuning shaft 14 and the switch and volume control shaft 15. A volume control rack 50 meshes with a gear 51 integral with the volume preselector member 37, this rack being integral with a slide member 52 movable transversely of the shaft along a guide 53 extending upwardly from and fixed to the base 17 of the housing. The volume control slide member 52 has an elongated slot 54 therein through which the drive shaft 45 extends, this slide member having upper and lower racks 55, 56 on opposite sides of its slot 54 and on opposite sides of a central plane extending through the slot, which are adapted to be engaged by a volume control pinion 57 fixed to the drive shaft. Engagement of the volume control pinion 57 with the upper rack 55 will shift the slide member 52 and volume control rack 50 in one direction to corresponding turn a volume preselector member 37 and volume control shaft 15; whereas, engagement of the drive pinion with the lower rack 56 will effect movement of the volume control rack 50 in the opposite direction to turn the volume control members 37, 15 in the opposite direction.

When the drive pinion 57 is disposed in a neutral position between the inner ends of the upper and lower racks 55, 56, it is out of mesh with both of the latter members and no motion will be transmitted from the drive pinion to either of the rack members. When in the neutral position, the drive pinion is just on the verge of meshing with both racks, very slight relative movement being required to effect mesh of the pinion with the upper rack or the lower rack, as the case may be. This is also true of the tuning pinion 46 when in its neutral position between the inner ends of the upper and lower racks 47, 48 of the tuning slide member 42. A very slight shifting of the tuning slide member across the axis of the drive shaft 45 will mesh either the upper rack 47 or the lower rack 48 with the drive pinion 46 to cause corresponding shifting of the tuner slide member 42 and of the tuning rack 41.

Figure 7:
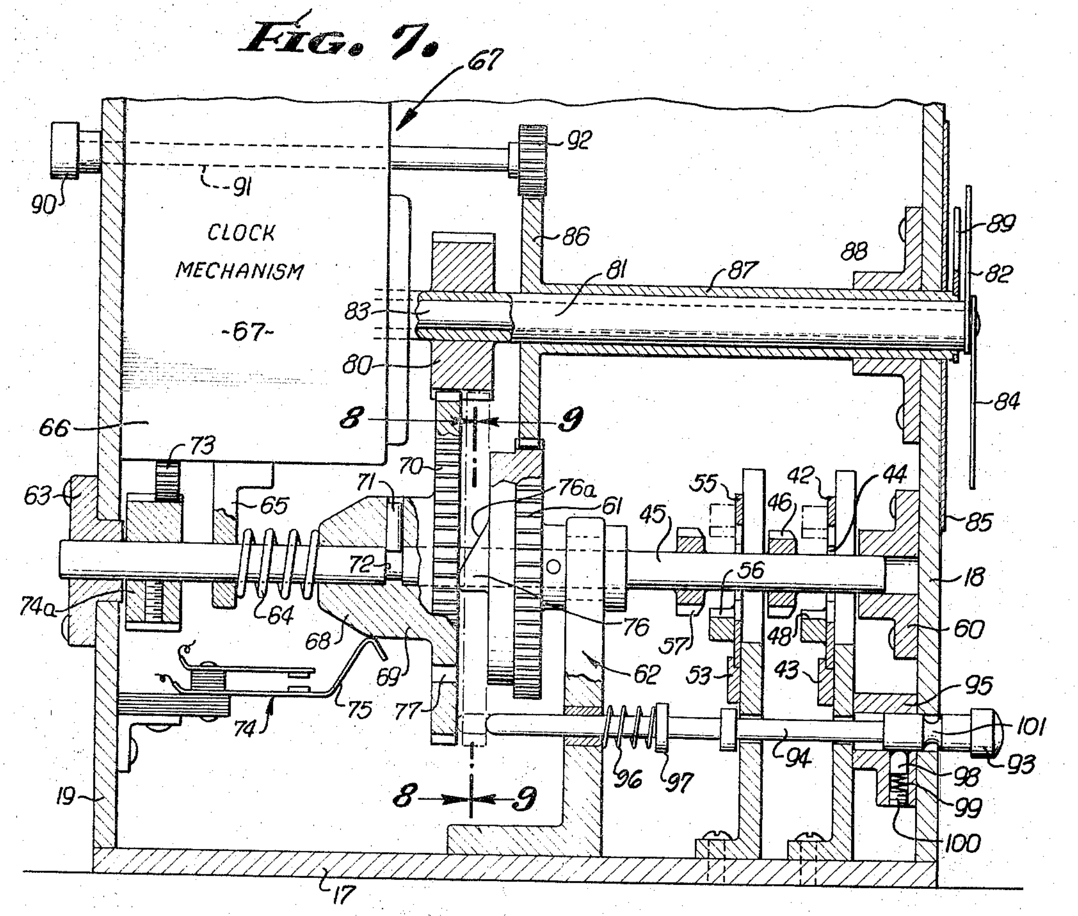
FIG. 7 is an enlarged vertical section taken along the line 7—7 on FIG. 1.
Figure 8:
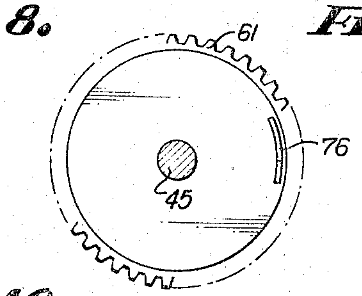
FIG. 8 is a section taken along the line 8—8 on FIG. 7.
Figure 9:
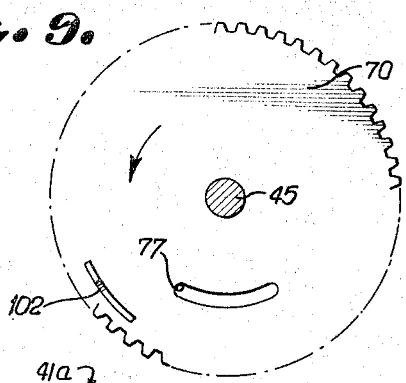
FIG. 9 is a section taken along the line 9—9 on FIG. 7.

The tuning pinion 46 and the volume control pinion 57 are fixed to the drive or actuating shaft 45 in axially spaced relation and are normally out of the planes of movement of their respective rack devices 42, 52, being in the position disclosed in FIG. 7. The drive or actuating shaft 45 is shiftable longitudinally to bring the pinions into mesh with their respective racks for the purpose of actuating the latter as a result of rotation of the drive shaft in one direction. Such drive shaft 45 is rotatably mounted in a forward bearing support 60 suitably secured to the front panel 18 of the housing, the shaft extending rotatably through a detent gear 61 rotatably mounted in a bracket 62 extending upwardly from and suitably secured to the base 17 of the housing. The rear portion of the shaft is rotatably mounted in a rear bearing support 63 suitably attached to the rear wall 19 of the housing. As stated above, the drive shaft is axially shiftable to bring the driving pinions 46, 57 into the planes of the rack slides 42, 52, whereby the pinions are adapted to mesh with the latter, and it is also shiftable in a rearward direction out of the planes of the slides.

Shifting of the shaft in a forward or meshing direction is performed by a helical compression spring 64 surrounding the shaft, with its rear portion bearing against a bracket and spring seat 65 suitably secured to the housing 66 of a clock mechanism 67 fixedly secured to the rear wall 19 of the housing, the spring engaging a tapered cam portion 68 of a release cam 69 integral with a gear 70 adapted to turn freely on the drive shaft 45, the turning being effected by the clock mechanism 67. Longitudinal movement of the gear 70 under the influence of the spring 64 is transmitted to the drive shaft 45 by one or more radial pins 71 secured to the hub of the gear, fitting within a peripheral groove 72 in the shaft, in effect providing a swivel connection therebetween. The shaft 45 itself can be rotated by a drive pinion 73 turned by the clock mechanism 67, which may be an electric clock, meshing with a gear 74*a* fixed to the shaft 45, the gear having a sufficient axial extent as to remain in mesh with the pinion 73 despite axial shifting of the gear with the drive shaft. In lieu of the drive pinion 73 being rotated by the clock mechanism, it may be rotated by a separate electric motor upon closing of a circuit to the latter, as by closing a power switch 74 suitably mounted in the housing (see FIG. 7).

The power switch 74 is normally retained in an open condition by engagement of a switch arm 75 with the periphery of the release cam 69 of the gear 70. However, when the gear 70 is permitted to shift axially to engage the pinions 46, 57 with their racks, the tapered portion 68 of the cam is disposed under the switch arm 75, permitting the latter, because its inherent resiliency, to shift upwardly and close the power switch 74. Obviously, shifting of the release cam 69 in the opposite direction against the force of the spring 64 causes the cam 68 to move the switch arm 75 to a switch opening position, as disclosed in FIG. 7.

The release gear 70 is normally retained in a position holding the drive pinions out of mesh with their respective racks by the forward face of the gear engaging a detent 76 projecting axially from a detent gear 61 rotatable in the bracket 62. The release gear has an arcuate opening 77 therein adapted to be aligned with the detent projection 76. When so aligned, the release gear 70 can be shifted forwardly by the spring 64 to engage the pinions 46, 57 with the rack members 42, 52. The release gear 70 is rotated by the clock mechanism 67 and the position of the detent gear 61 can be preselected so that the arcuate opening 77 of the release gear will become aligned with the detent 76 at a preselected time, effecting actuation of the mechanism. As specifically disclosed, the release gear 70 meshes with an hour gear 80 fixed to an hour wheel hub or sleeve 81 extending from the clock mechanism and through the front panel 18, the sleeve 81 having an hour hand 82 suitably secured thereto. The hour hub or sleeve 81 will make one full revolution every twelve hours and will rotate the release gear 70 a full revolution every twenty-four hours, in view of the relative diameters of the release gear and hour gear disclosed in FIG. 7. If desired, the pitch diameters of the two gears 70, 80 may be made the same so that the release gear 70 is rotated one revolution every twelve hours. A minute shaft 83 extends from the clock mechanism rotatably through the hour wheel sleeve 81 and has a minute hand 84 suitably secured to its outer end forwardly of the front panel. A suitable clock dial plate 85 is mounted on the front panel so that the hour and minute hands indicate the time of day.

The detent gear 61 meshes with an alarm setting gear 86 rotatably mounted on the hour sleeve 81, the setting gear being integral with a setting hub 87 rotatably mounted in a bearing support 88 suitably secured to the front panel 18 of the housing and extending therethrough, a setting hand 89 being suitably attached to the hub. An alarm setting knob 90 is attached to a shaft 91 and has a setting pinion 92 secured thereto meshing with the setting gear 86. By appropriate manipulation of the setting knob 90, the detent gear 61 can be adjusted to place its detent projection 76 in position for releasing the release gear 70 and effecting actuation of the mechanism at a preset time, as indicated by the position of the setting hand 89 on the clock dial 85. Turning of the setting knob 90 effects adjustment of the detent gear 61 and determines the time of day at which the arcuate opening 77 will be disposed in alignment with the detent projection 76 to permit the spring 64 to shift the shaft 45 forwardly to bring the pinions 46, 57 into mesh with the rack devices and effect actuation of the tuning shaft 14 and the volume control shaft 15 in the manner specifically described hereinbelow. As the release gear 70 continues to rotate, the end of its arcuate opening 77 will, after the passage of sufficient time, engage the inclined surface 76*a* of the detent projection 76 and effect a rearward shifting of the release gear 70 against the force of the spring 64 to disengage the pinions 46, 57 from the racks and also shift the power switch 74 to an open position.

If desired, the release gear 70 can be shifted rearwardly to open the power switch 74 and disengage the pinions from the racks at any time by shifting a knob 93 inwardly that is attached to a retainer rod 94 slidably mounted in the brackets 62, 95 suitably secured to the housing, the inner end of the rod 94 engaging the forward face of the release gear 70. The retainer rod is normally urged to an ineffective or released condition by a helical compression spring 96 engaging a flange 97 fixed to the rod and engaging one of the brackets 62. The retainer rod 94 can be releasably held in a position holding the release gear 70 in ineffective position by a suitable detent mechanism. As disclosed in FIG. 7, a detent pin 98 is slidably mounted in the bracket 95, being urged against the periphery of the rod by a helical compression spring 99 bearing against a spring seat 100, the detent pin being adapted to shift into a rod groove 101.

Assuming the retainer rod 94 to have been shifted inwardly to shift the release gear 70 to the left, as seen in FIG. 7, to disengage the pinions 46, 57 from their racks, or to prevent their engagement with the racks, and if such retainer rod is not subsequently returned to its ineffective position by pulling the knob 93 outwardly of the front panel, an axial release cam projection 102 on the release gear 70 will engage the inner end of the rod 94 and shift the latter forwardly, or to a released condition. This will enable the mechanism to operate properly when the preset time has been reached at which the detent gear projection 76 is aligned with the arcuate opening 77, allowing the gear meshing spring 64 to shift the drive shaft 45 forwardly and engage the pinions 46, 57 with their respective racks.

The turning of the tuner selector member 25 will correspondingly shift the rack slide 42 in its guide 43. When the slide is in the neutral position relative to the drive pinion 46, a mark or indication 103 on the tuner preselector is aligned with a companion indicator mark 104 on the front panel 18. To preselect a station, the tuner knob 11, with its clutch 33 engaged with the preselector member 25, is rotated to turn the preselector member 25 to the neutral position, as indicated by alignment of its mark or pointer 103 with the indicator mark 104. The gear 40 will have shifted the slide 42 to the neutral position at which the pinion 46 is incapable of meshing with either the upper or lower racks 47, 48. The tuner knob 11 is then pulled outwardly to release its clutch member 33 from the preselector member 25, whereupon the tuning knob can be turned without turning the preselector member 25 until the desired station has been tuned in. The knob 11 is then released, the spring 34 shifting the knob and the hollow shaft 21 inwardly to re-engage the clutch 33, 26, which then recouples the rack and pinion mechanism 40–48 with the tuning shaft 14. At this time, the tuning pinion 46 is in the position disclosed in FIG. 7 or out of a position to mesh with the upper or lower rack teeth 47, 48 of the tuner slide member. Following such preselection of the station, the tuner knob 11 can be turned to tune in any other desired station, the preselector member 25 turning therewith and shifting the indicator 103 out of alignment with the indicator mark 104, and also causing the gear 40 to shift the slide 42 crosswise of or relative to the drive pinion 46.

In a similar manner, the volume control knob 13 can be turned to bring the volume preselector member 37 to a position in which an indicator 105 thereon is aligned with an indicator mark 106 on the front panel. Such turning shifts the volume control slide 52 to a neutral position in which axial shifting of the drive shaft 45 and volume control pinion 57 into the plane of the slide cannot effect shifting of the latter, that is to say, the pinion 57 and slide are in a neutral relationship. The volume control knob 13 can then be pulled outwardly against the force of its spring 34 to unclutch the knob from the volume preselector member 37 and the volume preselected to the desired value, whereupon the volume control knob is released so that the spring 34 will reclutch the volume control knob with the preselector member 37. Following such clutching action, the volume control knob, if desired, can be shifted to any volume control position or the volume control knob can be turned to switch off the receiver. Such shifting of the volume control knob will turn the preselector member 37 and the volume control slide 52 so that the latter is no longer in its neutral position with respect to its companion drive pinion 57.

With the station and its sound volume having been preselected, the receiver is usable in the usual manner to tune in other stations, the sound being adjustable to any desired volume. The receiver may be shut off or can be shut off automatically by a clock controlled mechanism, if desired, in a known manner. The detent gear 61 will have been adjusted to the time at which the radio receiver is to be actuated to tune in the preselected station at the preselected volume. As the release gear 70 is rotated by the hour mechanism, it will reach the preset time for activating the receiver. When this condition is reached, the arcuate opening 77 is aligned with the detent 76, allowing the spring 64 to shift the release gear 70 and the drive shaft 45 forwardly to mesh the pinions 46, 57 with their respective companion racks, and also closing the power switch 74. The driving pinion 73 rotates the drive shaft 45 and turns the tuning pinion 46 and volume control pinion 57 at a desired speed. These pinions will mesh with either their respective upper racks or lower racks, depending upon the preselected settings of the tuning and volume control mechanisms, to effect a shifting of the racks 41, 50 in the proper direction to rotate the tuner preselector member 25 and the volume control preselector member 37 in the appropriate direction to correspondingly turn the tuning shaft 14 and the volume control shaft 15. When the preselected station and preselected volume is reached, their associated rack slides 42, 52 will have been shifted to neutral positions with respect to their pinions 46, 57, in which the latter are no longer in mesh with the rack teeth, whereupon further shifting of the rack slides ceases. Thus, the selected station at the selected volume will be presented to the listener. The particular station at the particular volume will be independent of the preexisting station or preexisting volume at which the receiver may have been previously shut off.

The pinions 46, 57 will remain in the planes of their respective slides 42, 52 until the release gear 70 has been rotated by the hour gear 80 sufficiently to cause the detent 76 to cam the release gear to its initial position against the force of the spring 64, opening the power switch 74 and shifting the pinions 46, 57 axially to an ineffective position. When this occurs, the receiver can thereafter be manually manipulated by turning the tuner knob 11 and the volume control knob 13 in the usual manner. If such manual tuning and volume control is desired before the release gear 70 has automatically shifted the drive shaft 45 and its pinions to an ineffective position, the detent knob 93 can be pressed inwardly to shift the release gear rearwardly and shift the pinions 46, 57 to their ineffective positions, as well as to open the power switch 74. After the release gear 70 has been turned by the clock mechanism to the position at which the detent 76 engages its face and holds it in the ineffective position, and if the retainer rod 94 has not been pulled outwardly, the cam 102 on the face of the release gear will automatically shift the retainer rod to its ineffective position, so that the mechanism is in condition for automatically actuating the tuner shaft 14 and the volume control shaft 15 at the preselected time.

It is, accordingly, apparent that any station and any volume within the limits of the receiver can be preselected, and that at the preset time, such station will be automatically tuned in and the receiver adjusted to the proper volume, regardless of the previous setting of the tuner or of the volume control device. If the tuner and volume control device were previously at the preselected settings, then the drive pinions would not mesh with either the upper or lower racks of the slide members 42, 52 and would effect no shifting, inasmuch as the drive pinions 46, 57 will then be in neutral positions. Regardless of the preselection of the station or of the volume, the tuner knob 11 and volume control knob 13 can be manipulated in the usual manner to tune in any other station at any other volume.

Figure 10:
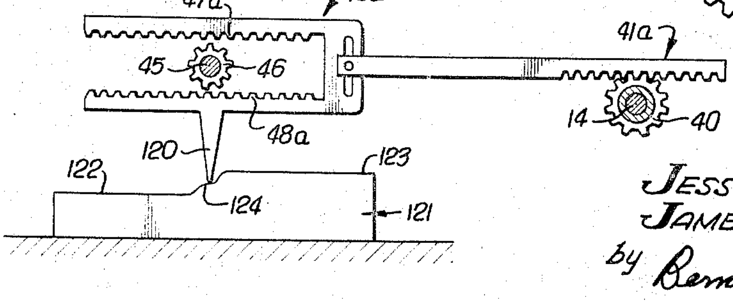
FIG. 10 is a front elevational view of a modified form of rack and pinion mechanism capable of incorporation in the apparatus.

A modified form of rack mechanism is disclosed in FIG. 10, which can be used in connection with the tuner gear 40 or volume control gear 51, or both. As shown, one of the racks, such as the tuner rack 41*a*, meshes with the tuner gear 40 and is connected to a slide member 42*a* having upper and lower rack teeth 47*a*, 48*a*. The upper and lower rack teeth are disposed above and below an axially shiftable drive pinion 46. A positioning member 120 is integral with, or otherwise suitably secured to, the slide member 42*a* and is adapted to rest on a locating member 121 therebelow, which has a plurality of steps, including a lower step 122 at which the upper rack 47*a* is engageable with the pinion, an upper step 123 at which the lower rack 48*a* is engageable with the pinion, and an intermediate step 124 in which both racks are prevented from engaging the pinion 46, which may be deemed to be a neutral position of the slide member.

The preselector member 25 is turned to place its indicator 103 in position with the companion indicator mark 104 on the front panel, its gear 40 meshing with the rack 41*a* and shifting the slide member 42*a* to the neutral position, such as shown in FIG. 10. The particular knob, whether it is the tuner knob or the volume control knob, can then be unclutched from its companion preselector member and the tuning shaft 14 or volume control shaft 15, as the case may be, turned until the desired position is reached, whereupon the knob is pushed inwardly to reengage the clutch. The knob can then be turned in its usual manner which will turn the selector member and its gear 40, effecting shifting of the rack 41*a* and the slide member 42*a* one way or the other, so that the locator member 120 either engages the lower step 122 or the upper step 123, so as to either bring the upper rack 47*a* or the lower rack 48*a* in position for meshing with the drive pinion 46. When the drive shaft 45 is shifted forwardly to shift the pinion into the plane of the slide member 42*a*, it will either engage the lower rack teeth 48*a* or the upper rack teeth 47*a*, depending upon the position of the slide member 120, the pinion rotating and shifting the slide member in one direction or the other toward the neutral position, the locating member 120 moving from the bottom step 122 to the neutral step 124 or from the upper step 123 to the neutral step, as the case may be, to act through the rack 41*a* and gear 40 to correspondingly turn the particular tuning shaft 14 or volume control shaft 15 associated therewith, until the neutral position is reached, at which time the rack slide 42*a* is automatically disconnected from the pinion 46.

We claim:

1. In a clock controlled signal receiver: a station tuning control; a volume control; a tuning preselector member adjustable relative to said tuning control; means releasably coupling said tuning member to said tuning control for joint movement therewith whereby the motion of said tuning member is transmitted to said tuning control; a volume preselector member adjustable relative to said volume control; means releasably coupling said volume member to said volume control for joint movement therewith whereby the motion of said volume member is transmitted to said volume control; a forward and reverse transmission operatively connected to said tuning member; a forward and reverse transmission operatively connected to said volume member; drive means drivably connectible to said transmissions and adapted to have a neutral relation with respect thereto; a timing mechanism; and means controlled by said mechanism at a preset time for establishing a driving connection between said drive means and said transmissions, whereby said drive means operates through said transmissions and preselector members to actuate said tuning control and volume control to their preselected positions upon shifting of said transmissions to a neutral relation with respect to said drive means.

2. In a clock controlled signal receiver: a station tuning control; a volume control; a tuning preselector member adjustable relative to said tuning control; means releasably coupling said tuning member to said tuning control for joint movement therewith whereby the motion of said tuning member is transmitted to said tuning control; a volume preselector member adjustable relative to said volume control; means releasably coupling said volume member to said volume control for joint movement therewith whereby the motion of said volume member is transmitted to said volume control; a forward and reverse transmission operatively connected to said tuning member; a forward and reverse transmission operatively connected to said volume member; drive means drivably connectible to said transmissions and adapted to have a neutral relation with respect thereto; a timing mechanism; means controlled by said mechanism at a preset time for establishing a driving connection between said drive means and said transmissions, whereby said drive means operates through said transmissions and preselector members to actuate said tuning control and volume control to their preselected positions upon shifting of said transmissions to a neutral relation with respect to said drive means; and means controlled by said timing mechanism for disestablishing the driving connection between said drive means and transmissions.

3. In a clock controlled signal receiver: a station tuning control; a volume control; a tuning preselector member adjustable relative to said tuning control; a clutch releasably coupling said tuning member to said tuning control for rotation therewith about a common axis; a volume preselector member adjustable relative to said volume control; a clutch releasably coupling said volume member to said volume control for rotation therewith about a common axis; a forward and reverse transmission operatively connected to said tuning member; a forward and reverse transmission operatively connected to said volume member; drive means drivably connectible to said transmissions and adapted to have a neutral relation with respect thereto; a timing mechanism; and means controlled by said mechanism at a preset time for establishing a driving connection between said drive means and said transmissions, whereby said drive means operates through said transmissions and preselector members to actuate said tuning control and volume control to their preselected positions upon shifting of said transmissions to a neutral relation with respect to said drive means.

4. In a clock controlled signal receiver: a station tuning control; a volume control; a tuning preselector member rotatably mounted on said tuning control for rotation with respect thereto; a clutch releasably coupling said tuning member to said tuning control for rotation therewith about a common axis; a volume preselector member rotatably mounted on said volume control for rotation with respect thereto; a clutch releasably coupling said volume member to said volume control for rotation therewith about a common axis; a forward and reverse transmission operatively connected to said tuning member; a forward and reverse transmission operatively connected to said volume member; drive means drivably connectible to said transmissions and adapted to have a neutral relation with respect thereto; a timing mechanism; and means controlled by said mechanism at a preset time for establishing a driving connection between said drive means and said transmissions, whereby said drive means operates through said transmissions and preselector members to actuate said tuning control and volume control to their preselected positions upon shifting of said transmissions to a neutral relation with respect to said drive means.

5. In a clock controlled signal receiver: a station tuning control; a volume control; a tuning preselector member rotatably mounted on said tuning control; clutch means releasably coupling said tuning member to said tuning control; a volume preselector member rotatably mounted on said volume control; clutch means releasably coupling said volume member to said volume control; a gear on each of said selector members; a reciprocable member for each selector member having a rack meshing with said gear on its associated selector member, each reciprocable member having forward and reverse racks thereon; drive means including a drive shaft, a first pinion on said shaft meshable with the forward and reverse racks of one reciprocable member and adapted to occupy a neutral position relative thereto ,a second pinion on said shaft meshing with the forward and reverse racks of the other reciprocable member and adapted to occupy a neutral position relative thereto; a timing mechanism; and measn controlled by said mechanism at a preset time for shifting said shaft to mesh said pinions with their respective forward and reverse racks, whereby said drive means actuates said tuning control and volume control to their preselected positions by shifting of said forward and reverse racks to their neutral positions relative to their respective pinions.

6. In a clock controlled signal receiver: a station tuning control; a volume control; a tuning preselector member rotatably mounted on said tuning control; clutch means releasably coupling said tuning member to said tuning control; a volume preselector member rotatably mounted on said volume control; clutch means releasably coupling said volume member to said volume control; a gear on each of said selector members; a reciprocable member for each selector member having a rack meshing with said gear on its associated selector member, each reciprocable member having forward and reverse racks thereon; drive means including a drive shaft, a first pinion on said shaft meshable with the forward and reverse racks of one reciprocable member and adapted to occupy a neutral position relative thereto, a second pinion on said shaft meshing with the forward and reverse racks of the other reciprocable member and adapted to occupy a neutral position relative thereto; a timing mechanism; means for shifting said shaft to mesh said pinions with their respective forward and reverse racks, whereby said drive means actuates said tuning control and volume control to their preselected positions by shifting of said forward and reverse racks to their neutral positions relative to their respective pinions; releasable means for preventing shifting of said shaft comprising a release member operatively connected to said timing mechanism to be moved thereby, and an adjustable detent member engaging said release member to prevent said shifting means from shifting said shaft until said release member is moved to a predetermined position by said timing mechanism.

7. In a clock controlled signal receiver: a station tuning control; a volume control; a tuning preselector member rotatably mounted on said tuning control; clutch means releasably coupling said tuning member to said tuning control; a volume preselector member rotatably mounted on said volume control; clutch means releasably coupling said volume member to said volume control; a gear on each of said selector members; a reciprocable member for each selector member having a rack meshing with said gear on its associated selector member, each reciprocable member having forward and reverse racks thereon; drive means including a drive shaft, a first pinion on said shaft meshable with the forward and reverse racks of one reciprocable member and adapted to occupy a neutral position relative thereto, a second pinion on said shaft meshing with the forward and reverse racks of the other reciprocable member and adapted to occupy a neutral position relative thereto; a timing mechanism; means for shifting said shaft to mesh said pinions with their respective forward and reverse racks, whereby said drive means actuates said tuning control and volume control to their preselected positions by shifting of said forward and reverse racks to their neutral positions relative to their respective pinions; releasable means for preventing shifting of said shaft comprising a release member operatively connected to said timing mechanism to be moved thereby, and an adjustable detent member engaging said release member to prevent said shifting means from shifting said shaft until said release member is moved to a predetermined position by said timing mechanism; said detent member and release member having coengageable means for shifting said shaft and its pinions out of meshing relation to said forward and reverse racks after actuation of said tuning control and volume control to their preselected positions.

8. In a clock controlled signal receiver: a station tuning control; a volume control; a tuning preselector member rotatably mounted on said tuning control; clutch means releasably coupling said tuning member to said tuning control; a volume preselector member rotatably mounted on said volume control; clutch means releasably coupling said volume member to said volume control; a gear on each of said selector members; a reciprocable member for each selector member having a rack meshing with said gear on its associated selector member, each reciprocable member having forward and reverse racks thereon; drive means including a drive shaft, a first pinion on said shaft meshable with the forward and reverse racks of one reciprocable member and adapted to occupy a neutral position relative thereto, a second pinion on said shaft meshing with the forward and reverse racks of the other reciprocable member and adapted to occupy a neutral position relative thereto; a timing mechanism; means for shifting said shaft to mesh said pinions with their respective forward and reverse racks, whereby said drive means actuates said tuning control and volume control to their preselected positions by shifting of said forward and reverse racks to their neutral positions relative to their respective pinions; releasable means for preventing shifting of said shaft comprising a release member operatively connected to said timing mechanism to be moved thereby, and an adjustable detent member engaging said release member to prevent said shifting means from shifting said shaft until said release member is moved to a predetermined position by said timing mechanism; and means for shifting said shaft and its pinions out of meshable relation to said forward and reverse racks after actuation of said tuning control and volume control to their preselected positions.

9. In a clock controlled signal receiver: a control element; a preselector member rotatably mounted on said element for rotation with respect thereto; clutch means releasably coupling said member to said element for rotation therewith about a common axis; a gear on said selector member; a reciprocable member having a rack meshing with said gear, said reciprocable member having forward and reverse racks thereon; drive means including a drive shaft, a pinion on said shaft meshable with the forward and reverse racks of said reciprocable member and adapted to occupy a neutral position relative thereto; a timing mechanism; and means controlled by said mechanism at a preset time for shifting said shaft to mesh said pinion with either of said forward and reverse racks, whereby said drive means actuates said element to its preselected position by shifting of said forward and reverse racks to their neutral position relative to said pinion.

10. In a clock controlled signal receiver: a control element; a preselector member rotatably mounted on said element for rotation with respect thereto; clutch means releasably coupling said member to said element for rotation therewith about a common axis; a gear on said selector member; a reciprocable member having a rack meshing with said gear, said reciprocable member having forward and reverse racks thereon; drive means including a drive shaft, a pinion on said shaft meshable with the forward and reverse racks of said reciprocable member and adapted to occupy a neutral position relative thereto; a timing mechanism; means for shifting said shaft to mesh said pinion with either of said forward and reverse racks, whereby said drive means actuates said element to its preselected position by shifting of said forward and reverse racks to their neutral position relative to said pinion; releasable means for preventing shifting of said shaft comprising a release member operatively connected to said timing mechanism to be moved thereby, and an adjustable detent member engaging said release member to prevent said shifting means from shifting said shaft until said release member is moved to a predetermined position by said timing mechanism.

11. In a clock controlled signal receiver: a control element; a preselector member rotatably mounted on said element; clutch means releasably coupling said member to said element; a gear on said selector member; a reciprocable member having a rack meshing with said gear, said reciprocable member having forward and reverse racks thereon; drive means including a drive shaft, a pinion on said shaft meshable with the forward and reverse racks of said reciprocable member and adapted to occupy a neutral position relative thereto; a timing mechanism; means for shifting said shaft to mesh said pinion with either of said forward and reverse racks, whereby said drive means actuates said element to its preselected position by shifting of said forward and reverse racks to their neutral position relative to said pinion; releasable means for preventing shifting of said shaft comprising a release member operatively connected to said timing mechanism to be removed thereby, and an adjustable detent member engaging said release member to prevent said shifting means from shifting said shaft until said release member is moved to a predetermined position by said timing mechanism; said detent member and release member having coengageable means for shifting said shaft and its pinion out of meshable relation to said forward and reverse racks after actuation of said element to its preselected position.

12. In a clock controlled signal receiver; a control element; a preselector member rotatably mounted on said element; clutch means releasably coupling said member to said element; a gear on said selector member; a reciprocable member having a rack meshing with said gear, said reciprocable member having forward and reverse racks thereon; drive means including a drive shaft, a pinion on said shaft meshable with the forward and reverse racks of said reciprocable member and adapted to occupy a neutral position relative thereto; a timing mechanism; means for shifting said shaft to mesh said pinion with either of said forward and reverse racks, whereby said drive means actuates said element to its preselected position by shifting of said forward and reverse racks to their neutral position relative to said pinion; releasable means for preventing shifting of said shaft comprising a release member operatively connected to said timing mechanism to be moved thereby, and an adjustable detent member engaging said release member to prevent said shifting means from shifting said shaft until said release member is moved to a predetermined position by said timing mechanism; and means for shifting said shaft and its pinion out of meshable relation to said forward and reverse racks after actuation of said element to its preselected position.

13. In a mechanical movement: a rotatable gear; a reciprocable member having a rack meshing with said gear, said member having forward and reverse racks thereon; a drive shaft; a pinion on said shaft meshable with said forward and reverse racks and adapted to occupy a neutral position relative thereto; and means for shifting said shaft axially to mesh said pinion selectively with said forward or reverse racks, whereby rotation of said shaft rotates said gear by shifting said reciprocable member to its neutral position relative to said pinion.

14. In a mechanical movement: a rotatable gear; a reciprocable member having a rack meshing with said gear; a drive shaft; a pinion on said shaft; said member having forward and reverse racks thereon on opposite sides of said shaft adapted to mesh with said pinion and to occupy a neutral position relative thereto; and means for shifting said shaft axially to mesh said pinion selectively with said forward or reverse racks, whereby rotation of sad shaft rotates said gear by shifting said reciprocable member to its neutral position relative to said pinion.

15. In a mechanical movement: a rotatable gear; a reciprocable member having a rack meshing with said gear; a drive shaft; a pinion on said shift; said member having forward and reverse racks thereon on opposite sides of said shaft adapted to mesh with said pinion and to occupy a neutral position relative thereto; one of said racks extending laterally of said shaft in one direction; the other of said racks extending laterally of said shaft in the opposite direction; and means for shifting said shaft axially to mesh said pinion selectively with said forward or reverse racks, whereby rotation of said shaft rotates said gear by shifting said reciprocable member to its neutral position relative to said pinion.

16. In a mechanical movement: a rotatable gear; a reciprocable member having a rack meshing with said gear; a drive shaft; a pinion on said shaft; said member having forward and reverse racks thereon opposite each other and an opposite sides of said shaft; means selectively locating said forward or reverse rack in a position for meshing with said pinion or in a neutral position in which neither rack can mesh with said pinion; and means for shifting said shaft axially to mesh said pinion selectively with said forward or reverse racks, whereby rotation of said shaft rotates said gear by shifting said reciprocable member to its neutral position relative to said pinion.

References Cited

UNITED STATES PATENTS

| | | | |
|---|---|---|---|
| 367,281 | 7/1887 | Estlow | 74—30 |
| 2,197,312 | 4/1940 | Nelson | 325—395 |
| 2,335,114 | 11/1943 | Gills | 325—396 |
| 2,584,155 | 2/1952 | Owens | 325—399 |

KATHLEEN H. CLAFFY, *Primary Examiner.*

A. H. GESS, *Examiner.*